INVENTOR
FIORINO FIORINI

BY Hurvitz & Rose

ATTORNEYS

INVENTOR
FIORINO FIORINI

BY Hurvitz & Rose

ATTORNEYS

SPLIT-PHASE CODE MODULATION SYNCHRONIZER AND TRANSLATOR

Filed Aug. 20, 1965 6 Sheets-Sheet 3

INVENTOR
FIORINO FIORINI
BY Hurwitz & Rose
ATTORNEY

INVENTOR
FIORINO FIORINI
BY Hurvitz & Rose
ATTORNEYS

INVENTOR
FIORINO FIORINI

BY Hurwitz & Rose

ATTORNEYS

INVENTOR
FIORINO FIORINI
BY Hurvitz & Rose
ATTORNEYS

United States Patent Office 3,361,978

Patented Jan. 2, 1968

3,361,978

SPLIT-PHASE CODE MODULATION SYNCHONIZER AND TRANSLATOR

Fiorino Fiorini, Viareggio, Italy, assignor to Radiation Incorporated, Melbourne, Fla., a corporation of Florida Filed Aug. 20, 1965, Ser. No. 481,204
20 Claims. (Cl. 328—30)

This invention relates to a synchronizer circuit for generating clock pulse signals which are accurately synchronized with a split-phase pulse code modulated input signal, and to a translator circuit operative in combination with the synchronizer to translate the split-phase pulse code modulated input signals into single phase form.

Split-phase pulse code modulation (split-phase PCM) is a binary code which is particularly useful in transmitting binary information from one place to another via a transmission line or radio transmission link. In split-phase PCM, binary information is transmitted in a sequence of bit time periods each containing a pair of signals which, taken together, represent a binary 1 or a binary 0. A binary 1 is represented by a "mark" in one half of the corresponding bit time period and a "space" in the other half of the same bit time period. (The "mark" is a pulse of predetermined polarity, and the "space" can be either a pulse of the opposite polarity or simply the absence of any output signal.) A binary 0 is represented by a mark and a space whose order is reversed from that used to represent a binary 1. For example, if a binary 1 is represented by a mark in the first half of the bit time period and a space in the second half, a binary 0 would be represented by a space in the first half of the bit time period and a mark in the second half.

Split-phase PCM derives its name from the fact that each bit time period is split into two halves which, taken together, define one bit of binary information. Since the pulses transmitted in split-phase PCM are only half as wide as those transmitted in single-phase PCM, it is obvious that split-phase PCM has the drawback of requiring broader band circuits than would be necessary for single-phase PCM at the same bit rate. The split-phase form, however, has an important advantage which more than compensates for this drawback. Since there is a signal transition in each bit time period of the split-phase PCM signal, regardless of the information being transmitted, there is no need to transmit a clock pulse signal defining the bit time periods. With split-phase PCM, clock pulses can be generated independently at the receiving end of the circuit and accurately synchronized with the transmitter clock pulses by sync pulses derived from the transitions in the split phase PCM signals. This cannot be accurately accomplished with single-phase PCM signals, because there are no signal transitions in single-phase PCM when a sequence of binary 1's or binary 0's is being transmitted, and this absence of signal transitions allows the receiver clock circuit to drift out of synchronization with the transmitter clock circuit.

Because of its self-clocking feature, the split-phase PCM code is often used in preference to the single-phase PCM code even though the split-phase code requires a broader band transmission link.

When split-phase PCM data is received by a receiver or processed from a tape recording, it is necessary to generate receiver clock pulse signals which are synchronized with the signal transition in the PCM data. There is, however, an inherent phase ambiguity that must be resolved before the proper clock pulses can be generated. This ambiguity arises from the fact that the signal transitions in split-phase PCM data can be used to synchronize two clocks which have the same frequency but which are 180° out of phase with each other. One of these clocks will represent the bit time periods used in transmission of the split phase PCM data, but the other one will not. Accordingly, it is necessary to provide means for resolving this phase ambiguity in order to generate receiver clock signals which are accurately synchronized with the transmitter clock signals used in transmitting the data.

Furthermore, although it is advantageous to transmit data in the split-phase PCM code, this code is not compatible with standard digital computer circuitry, and it is also necessary to translate the split-phase PCM data into a single-phase code such as NRZ–C or the like.

In accordance with this invention, there is provided a synchronizer and translator circuit for resolving the clock phase ambiguity inherent in split-phase PCM data, for generating a synchronized clock signal of the correct phase and frequency, and for translating the split-phase PCM data into single-phase form. The synchronizer of this invention is based on the fact that the integral of split-phase PCM signals over the correct bit time period is always equal to zero, regardless of the information represented thereby, and that the integral of split-phase PCM signals over an out-of-phase bit time period has a positive or negative value during transitions of the split-phase data from a logical 1 to a logical 0 or from a logical 0 to a logical 1. Accordingly, by integrating the split-phase PCM data over the bit time periods defined by two clock signals which are out of phase with each other by 180°, and by comparing the values of the integrals over a number of bit time periods, the correct clock phase is identified by the fact that it consistently produces a smaller number of non-zero integrals than the other phase. The correct clock phase is then gated into a rectifier circuit which translates the split-phase PCM data into single phase form.

In accordance with another aspect of this invention, the zero level for each integrator is established by a positive and a negative threshold circuit which define a "dead zone" at the output of each integrator. When the voltage of the integrator lies within this "dead zone," no output signal will be produced.

When the voltage of the integrator exceeds either the positive or negative threshold level at the end of the integration period, an output signal will be produced. The positive and negative threshold levels can be set to any desired values to eliminate the effect of fortuitous voltage variations in the integrator circuits.

In accordance with a further aspect of this invention, the outputs of the integrator circuits are compared over a number of bit time periods by means of a pair of digital counters, each coupled to the output of a corresponding integrator, and a digital comparator circuit coupled to the two digital counters. Each counter is advanced by one step in its count when the output of the corresponding integrator is outside of the "dead zone" at the end of its integration period, whereby the counter containing the smaller number will indicate the correct clock phase.

Accordingly, one object of this invention is to provide a synchronizer circuit for generating clock pulse signals which are accurately synchronized with a split-phase pulse code modulated input signal.

Another objective of this invention is to provide a translator circuit operative in combination with said synchronizer circuit to translate said split-phase pulse code modulated input signal into single-phase form.

A further object of this invention is to provide improved means for resolving the clock phase ambiguity in a split-phase pulse code modulation synchronizer to determine the correct clock phase therefor.

An additional object of this invention is to provide improved means for translating split-phase pulse code modulated signals into single phase form.

Another object of this invention is to provide improved means for generating a clock pulse signal which is accurately synchronized with a split-phase pulse code modulated input signal.

Other objects and advantages of this invention will become apparent to those skilled in the art from the following description of several specific embodiments thereof, as illustrated in the attached drawings, in which.

Figure 1:
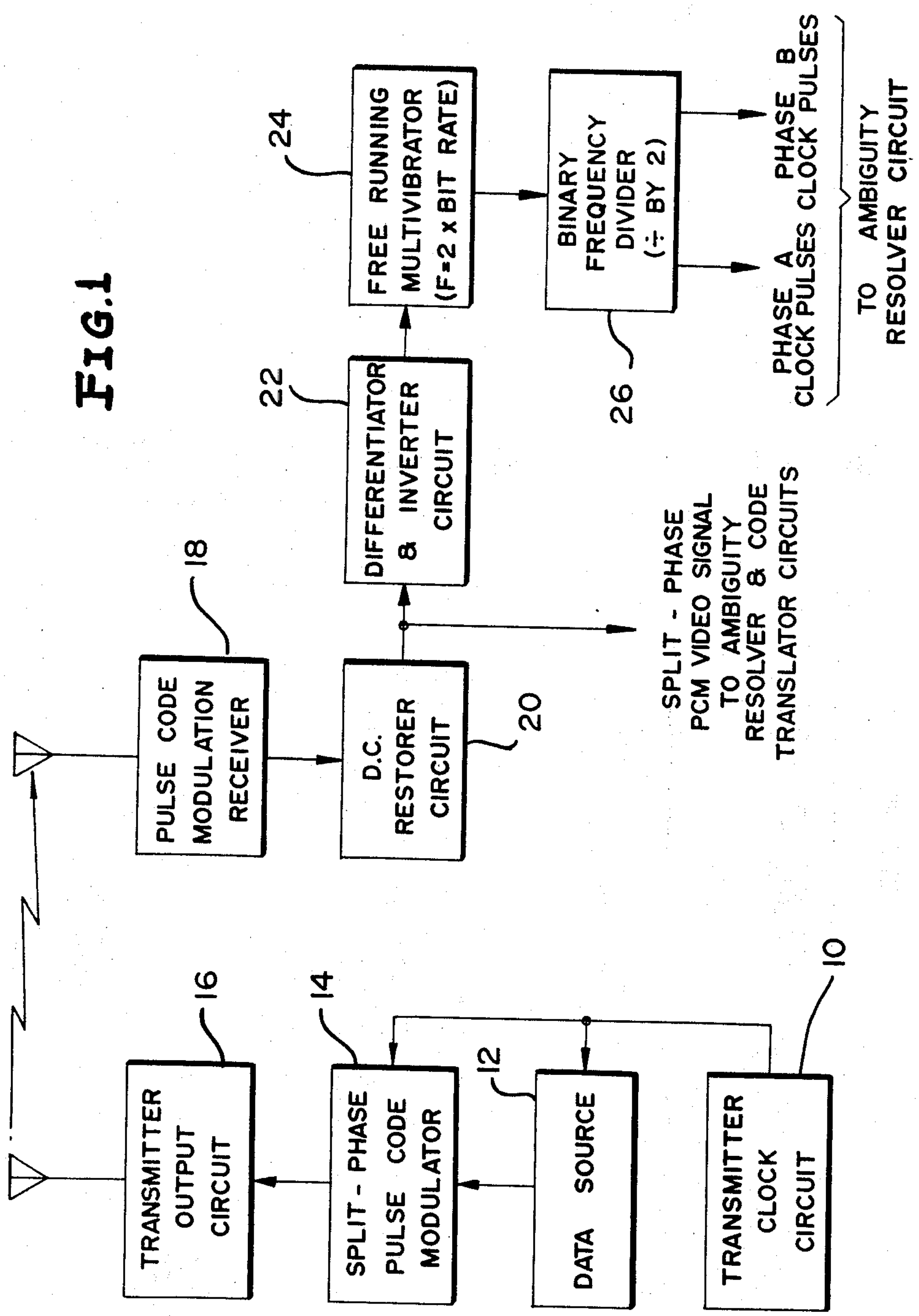
FIGURE 1 is a block diagram of a split-phase pulse code modulation transmitter and the clock pulse generator portion of one specific embodiment of this invention.
Figure 2:
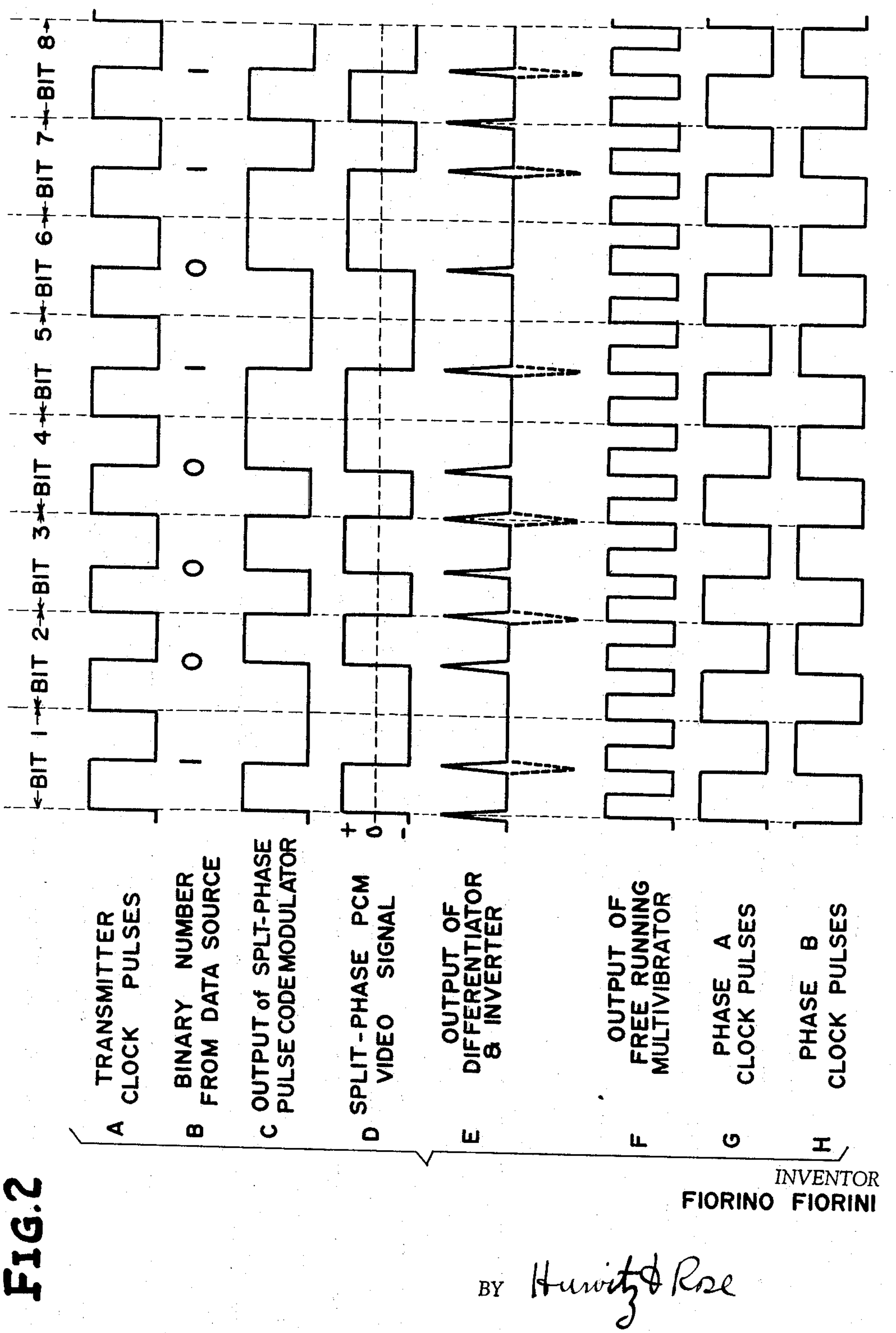
FIGURE 2 is a set of waveforms illustrating the operation of the transmitter and clock pulse generator circuits shown in FIGURE 1.

Referring to FIGURES 1 and 2, split-phase PCM signals are generated by prior art data transmission means including a transmitter clock circuit 10, a data source 12, a split-phase pulse code modulator 14, and a transmitter output circuit 16. Transmitter clock circuit 10 produces a train of clock pulses which define bit time periods as shown in waveform A of FIGURE 2. These transmitter clock pulses are applied to data source 12 and to split-phase pulse code modulator 14 to provide a sequence of bit time periods for the collection and transmission of binary data from data source 12. Waveform B of FIGURE 2 shows an illustrative sequence of binary digits such as might be generated by data source 12, and waveform C shows the split-phase pulse code modulated signals which correspond to that particular sequence of binary digits. In the split phase PCM code, a binary 1 is represented by a "mark" in one-half of the corresponding bit time period and a "space" in the other half of the corresponding bit time period. (The "mark" is a pulse of predetermined polarity, and the "space" can be either a pulse of opposite polarity or simply the absence of any output signal.) A binary 0 is represented by a mark and a space whose order is reversed from that of the mark and space representing a binary 1. In this particular example, a binary 1 is represented by a mark in the first half of the bit time period and a space in the second half of the bit time period, while a binary 0 is represented by a space in the first half of the bit time period and a mark in the second half of the bit time period. It will be understood, however, that the particular sequence used to represent a binary 1 is arbitrary, and that the binary 1 could just as well be represented by a space in the first half of the bit period and a mark in the second half. In this case, of course, a binary 0 would be represented by a mark in the first half of the bit time period and a space in the second half.

The split-phase PCM output signal of modulator 14 is applied to transmitter output circuit 16, which can comprise any suitable radio frequency pulse transmitter circuit. The radio frequency output signals of transmitter 16 are received by a pulse code modulation receiver circuit 18, which detects the radio frequency energy in the conventional manner, and produces a detected output signal duplicating the modulation impressed on the radio frequency carrier signal. This signal is applied to a DC restorer circuit 20, which polarizes the waveforms in the conventional manner to produce positive going and negative going voltage pulses of approximately equal amplitude, as illustrated in waveform D of FIGURE 2. Receiver 18 can comprise any suitable prior art video receiver circuit, and DC restorer circuit 20 can comprise any suitable prior art DC restorer circuit.

The output of DC restorer circuit 20 is applied to the ambiguity resolver and code translator portions of this invention, which will be explained in detail hereinafter, and also to a clock pulse generator circuit comprising a differentiator and inverter circuit 22, a free running multivibrator 24, and a binary frequency divider 26. The split-phase PCM video signal is applied to differentiator and inverter circuit 22, which differentiates the pulses thereof to produce a positive going spike at the leading edge of each mark and a negative going spike at the trailing edge of each mark. The positive going spikes are passed directly to the output of the circuit 22, but the negative going spikes are inverted and applied to the output of circuit 22 as positive going spikes. This is indicated in waveform E of FIGURE 2 by the fact that the negative going spikes are shown in dotted lines. The solid positive going spikes shown in waveform E of FIGURE 2 represent the output signal of differentiator and inverter circuit 22, and it can be seen that this output comprises an alternating sequence of positive differentiator spikes and inverted negative differentiator spikes. These spikes are applied to the input of free running multivibrator 24, which operates at approximately twice the bit rate of the split-phase PCM video signal, and which is synchronized by the differentiator spikes in the conventional manner, thereby producing an output square-wave which is synchronized with the split-phase PCM signal as shown in waveform F of FIGURE 2. The output of free running multivibrator 24 is divided by two in binary frequency divider 26, which produces complementary output pulses that are equal in frequency to the bit rate of the split-phase PCM video signal and synchronized with the split-phase PCM video signal except for the fact that a phase ambiguity exists, as shown by waveforms G and H of FIGURE 2. The two outputs of binary frequency divider 26 are equal in frequency, but they are 180° out of phase with each other, and only one of them represents the clock signal which was used to modulate the split-phase PCM video signal to which they are synchronized. This ambiguity is inherent in the nature of the split-phase PCM code format, as can be verified by noting that either of the two outputs of binary frequency divider 26 can be locked in sync with the sync pulses derived from the transitions in the split-phase PCM video signal. Accordingly, before the split-phase PCM video signal can be processed, it is necessary to determine which of the two possible phases of the clock output signal is the correct phase.

Free-running multivibrator 24 can be any suitable prior art circuit which is adapted to be synchronized by positive going voltage pulses. The frequency of multivibrator 24 is set in advance to approximately twice the bit rate of the incoming signal, which is known in advance, and it is synchronized to exactly twice the bit frequency by the output of differentiator and inverter circuit 22 in the conventional manner. Differentiator and inverter circuit 22 and binary frequency divider 26 can also comprise any suitable prior art circuits, many of which are known to those skilled in the art.

It should be noted that a sinusoidal oscillator can also be used to generate the clock pulse signals described above, and one illustrative sinusoidal clock pulse generator will be described later in connection with FIGURE 7.

Figure 3:
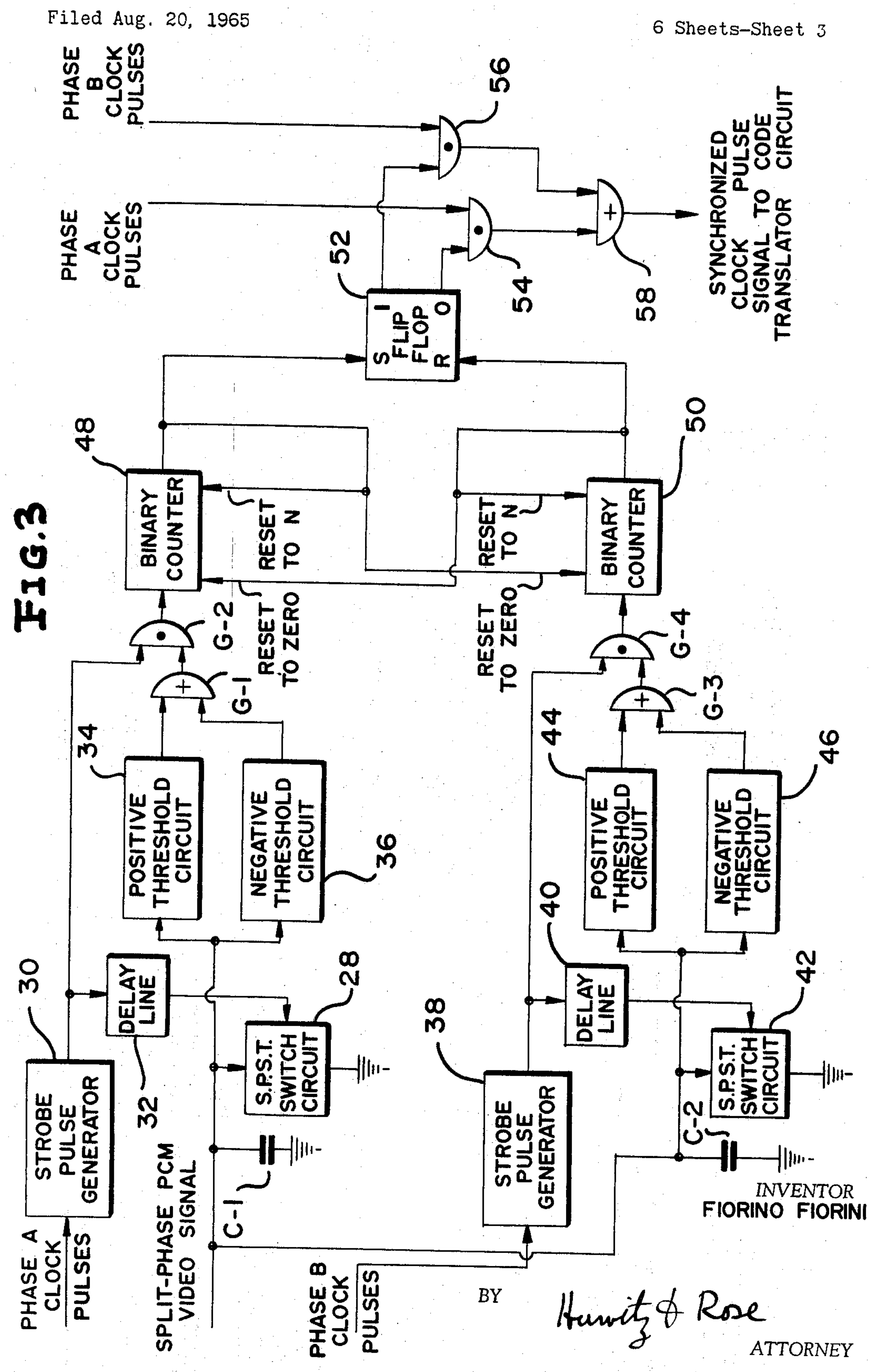
FIGURE 3 is a block diagram of the ambiguity resolver portion of said one specific embodiment of this invention.
Figure 4:
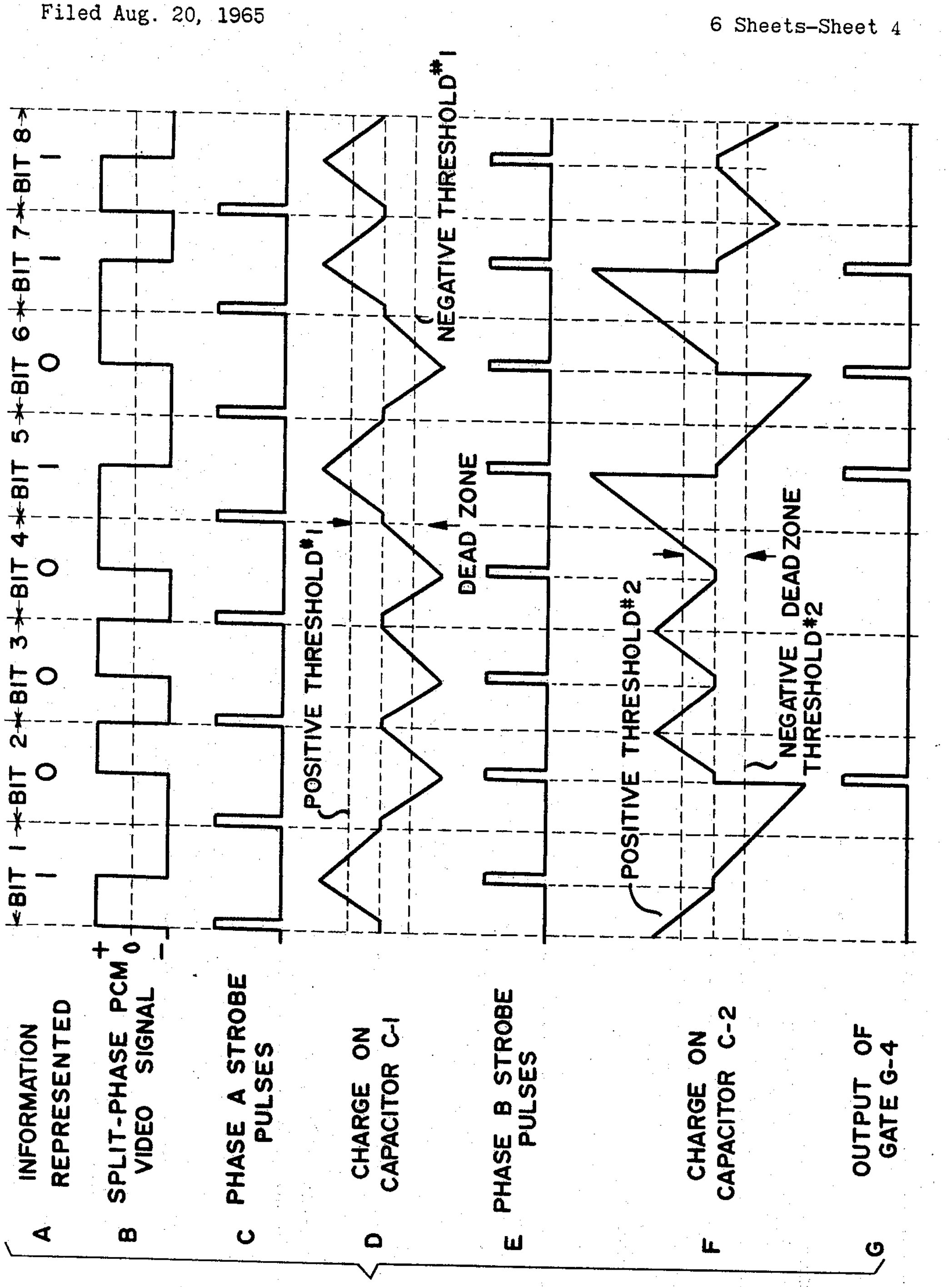
FIGURE 4 is a set of waveforms illustrating the operation of the ambiguity resolver circuits shown in FIGURE 3.

FIGURE 3 shows a block diagram of one specific ambiguity resolver circuit of this invention, and FIGURE 4 contains a set of waveforms illustrating the operation of the ambiguity resolver shown in FIGURE 3. The split-phase PCM video output signal of DC restorer circuit 20

(see FIGURE 1) is applied in parallel to two integrating capacitors $C_1$ and $C_2$. Integrating capacitor $C_1$ is periodically shorted to ground by a single-pole-single-throw switch circuit 28, which is actuated by a delayed pulse from a strobe pulse generator 30, which comprises a single shot multivibrator circuit. Strobe pulse generator 30 is triggered by the phase A clock pulse signals from binary frequency divider 26, and produces a relatively narrow strobe pulse at the start of each bit period defined by the phase A clock pulses, as illustrated by waveform C of FIGURE 4. Since the start of one bit time period corresponds to the end of the preceding bit time period, the output of strobe pulse generator 30 also represents the end of the bit time period. The output of strobe pulse generator 30 is delayed in delay line 32 by a time interval which is approximately equal to the width of the strobe pulse in order to allow the output circuit of the ambiguity resolver to be strobed before the charge on capacitor $C_1$ is shorted to ground by S.P.S.T. switch circuit 28.

The output of integrating capacitor $C_1$ is applied in parallel through a positive threshold circuit 34 and a negative threshold circuit 36. These threshold circuits define a "dead zone" within which the charge of capacitor $C_1$ is considered to be zero. Positive threshold circuit 34 develops an output signal whenever the charge on capacitor $C_1$ exceeds a predetermined positive threshold level, and negative threshold circuit 36 develops an output signal whenever the charge on capacitor $C_1$ exceeds a predetermined negative threshold level. The outputs of threshold circuits 34 and 36 are applied to an OR gate $G_1$, whose output is applied to an AND gate $G_2$. AND gate $G_2$ is enabled at the end of each phase A bit time period by the output of strobe pulse generator 30. If the charge on capacitor $C_1$ exceeds either threshold level at the end of the bit time period, an output pulse will be developed at the output of gate $G_2$, but if the charge on capacitor $C_1$ is within the dead zone defined by the positive and negative threshold levels, no output pulse will appear at the output of gate $G_2$ at the end of the bit period.

By means of the above-described circuit elements, the split-phase PCM video signal is repeatedly integrated over each bit period defined by the phase A clock pulses, and an output pulse is developed at the output of gate $G_2$ for every bit time period in which the integral exceeds the positive or negative threshold levels defined by threshold circuits 34 and 36. If the bit time period defined by the phase A clock pulses coincides with the transmitter bit time period used in modulating the split-phase PCM video signal, which is true in this particular example, the charge on capacitor $C_1$ will never exceed either threshold level except for an occasional false indication caused by noise or other fortuitous electrical disturbances in the circuit. This can be better appreciated by tracing the operation of the circuit as thus far described with specific reference to waveforms A, B, C and D of FIGURE 4.

Referring to waveform D of FIGURE 4, the charge on capacitor $C_1$ rises to a positive value which exceeds the positive threshold during the first half of bit time period number 1, as defined by the phase A strobe pulses, and then discharges back to 0 in the second half of the bit period. This is caused by the presence of a mark in the first half of the bit time period and a space in the second half of the bit time period. In the second bit time period, the charge on capacitor $C_1$ drops to a negative voltage below the negative threshold during the first half of the bit period and then discharges back to zero during the second half of the bit period due to the presence of the space in the first half of the bit period and a mark in the second half of the bit time period. A similar action occurs in the succeeding bit time periods, and at the end of each bit time period, the charge on capacitor $C_1$ lies within the dead zone defined by the positive and negative threshold levels. This occurs because the bit time period defined by the phase A strobe pulses are in phase with the bit time periods of the split-phase PCM video signal, whereby each integration period of capacitor $C_1$ will contain a positive and negative signal of approximately equal amplitude and equal duration. Accordingly, AND gate $G_2$, which is only enabled during the period of the phase A strobe pulse, will never develop any output pulses in the normal operation of the circuit in this particular example.

The circuit coupled to integrating capacitor $C_2$ is similar to the above-described circuit which is coupled to capacitor $C_1$. Strobe pulse generator 38, delay line 40, and single-pole-double-throw switch circuit 42 are identical to and perform the same function as the above-described circuits 30, 32 and 28. Positive threshold circuit 44 and negative threshold circuit 46 are identical to and perform the same function as the above-described threshold circuits 34 and 36. Gates $G_3$ and $G_4$ also perform the same function as gates $G_1$ and $G_2$. Accordingly, the circuit elements coupled to integrating capacitor $C_2$ cause this capacitor to repeatedly integrate the split-phase PCM video signal over the bit time period defined by the phase B clock pulses. In the particular example illustrated in FIGURE 4, the phase B clock pulses are out of phase with the split-phase PCM video signal, whereby an output signal will be developed by output gate $G_4$ at the end of each bit period which lies between a logical one and a logical zero in the split-phase PCM video signal. This can be more clearly understood by tracing the integrating action of capacitor $C_2$ with specific reference to waveforms A, B, E, F and G, of FIGURE 4.

Referring to FIGURES 3 and 4, capacitor $C_2$ charges up to a negative level which exceeds the negative threshold during the first half of the first bit period defined by the phase B strobe pulses in waveform E, and then charges to a lower negative value in the second half of the bit time period defined by those pulses. This occurs because both halves of the bit time periods thus defined contain negative signals. Accordingly, at the end of the first bit time period defined by the phase B strobe pulses, the charge on capacitor $C_2$ appreciably exceeds the negative threshold set by threshold circuit 46, and an output pulse is developed at the output of gate $G_4$ when it is enabled by a strobe pulse output from strobe pulse generator 38. In the second bit time period defined by the phase B strobe pulses, capacitor $C_2$ first charges up to a positive value in excess of the positive threshold level, and then returns to zero by the end of the bit time period thus defined. This is due to the fact that a positive signal appears in one half of that bit period, and a negative signal appears in the other half of the period. The same action occurs in the third bit period defined by the phase B strobe pulses, but in the fourth bit period, capacitor $C_2$ receives a positive charge in both halves of the bit time period due to the fact that a positive signal appears in both halves of that period. Accordingly, at the end of the fourth bit period defined by the phase B strobe pulses, the charge on capacitor $C_2$ appreciably exceeds the positive threshold level, and another output pulse is generated at the output of gate $G_4$ when the strobe pulse is applied thereto. In the fifth bit time period, the charge of capacitor $C_2$ ends up at a negative level again, due to the presence of two negative signals in that particular bit period. In the sixth bit time period, the charge on capacitor $C_2$ ends up at a positive level due to the presence of positive signals in that particular time period. In general, the charge on capacitor $C_2$ will end up outside of the dead zone defined by its positive and negative threshold circuits whenever the split-phase PCM video signal changes from a logical 1 to a logical 0 or vice-versa, but it will end up inside of the dead zone when there is no change in the binary data represented by the split-phase PCM video signal. Accordingly, it will be apparent that the integrals measured by capacitors $C_1$ and $C_2$ must be compared over a plurality of bit time periods in order to ascertain which of the two integrating periods consistently produces the smaller number of non-zero integrals regardless of the information contained in the split-phase PCM video signal. In general terms, this is accomplished by counting the output pulses of gates $G_2$ and $G_4$ over a plurality of bit time periods and ascertaining which of the two produces a lower number of output pulses during the counting time period.

The output pulses from gate $G_2$ are applied to a binary counter circuit 48, and the output pulses from gate $G_4$ are applied to a binary counter circuit 50. In the particular example illustrated in FIGURE 4, gate $G_2$ does not produce any output pulses, since it is associated with the capacitor which is integrating over the correct bit time period. Gate $G_4$, however, produces an output pulse every time there is a transition in the split-phase PCM binary information, and each output pulse from gate $G_4$ advances binary counter 50 by one step in its counting cycle. Over a period of time, false output pulses may occasionally be developed at the output of gate $G_2$ due to noise or other fortuitous electrical disturbances, but these false indications will be smaller in number than the binary transitions in the input signal. Accordingly, in this particular example, the count in binary counter 50 will be larger than the count in binary counter 48.

In the due course of time, binary counter 50 will overflow and reset a flip-flop 52 whose output controls a gating circuit that selects the correct clock pulse phase as the output clock signal. This is done by means of AND gates 54 and 56 and OR gate 58. When flip-flop 52 is reset, AND gate 54 is enabled and AND gate 56 is disabled, thereby passing the phase A clock pulses to OR gate 58 and blocking the phase B clock pulses. If the situation is reversed, and flip-flop 52 is set by binary counter 48, AND gate 56 would be enabled and AND gate 54 would be disabled, thereby passing the phase B clock pulses to OR gate 58 and blocking the phase A clock pulses. In addition to resetting flip-flop 52, binary counter 50 also resets counter 48 to zero and resets itself to a number N which is greater than zero. This preserves the information that the phase B clock pulses are out of phase with the split-phase PCM video signal. Binary counter 50 will, of course, repeatedly overflow and repeatedly trigger flip-flop 52 at its reset terminal, but since the flip-flop is already in the reset state, it will simply remain there and continue to gate the phase A clock pulses to OR gate 58 to provide a synchronized clock pulse output signal which is in phase with the split-phase PCM video signal.

In the case where the phase B clock pulses are in phase with the split-phase PCM video signal, and the phase A clock pulses are out of phase, the sequence of operations described above would be inverted, and the waveform shown for the charge on capacitor $C_1$ would apply to capacitor $C_2$ and vice versa. In this case, the output of binary counter 48 would control the circuit and flip-flop 52 would be triggered to its set state instead of its reset state to select the phase B clock pulses as the correct clock pulse phase.

Figure 5:
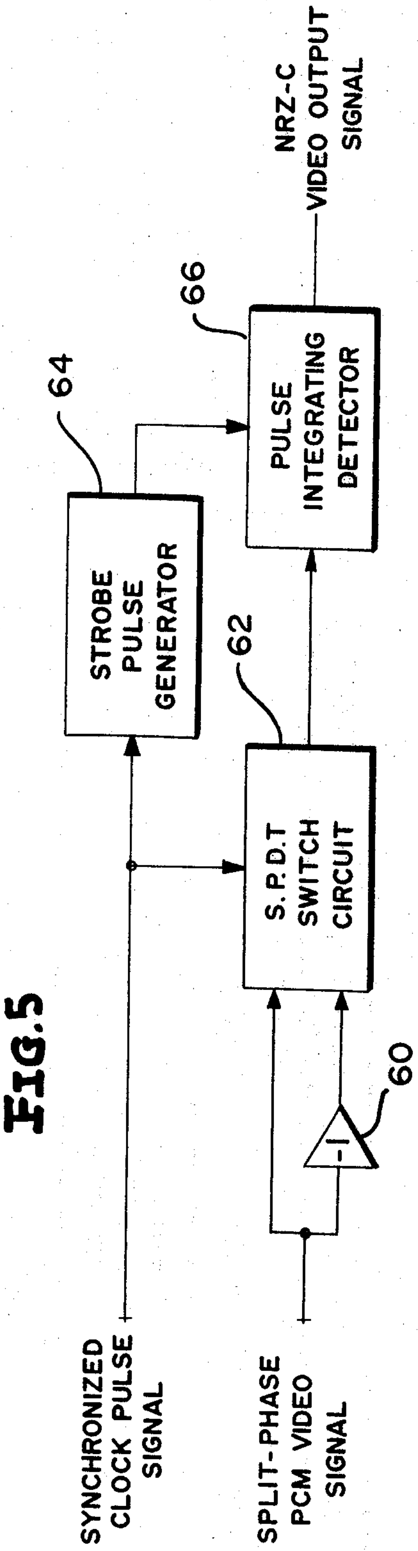
FIGURE 5 is a block diagram of the code translator portion of said one specific embodiment of this invention.
Figure 6:
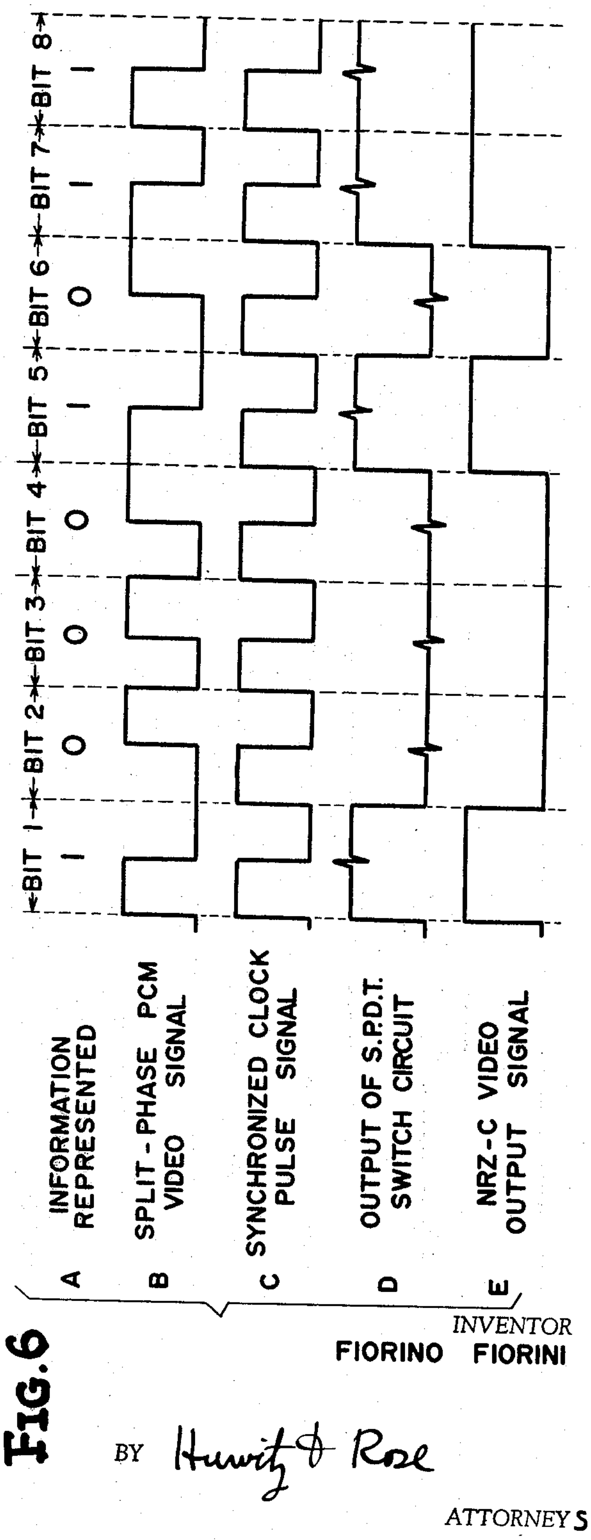
FIGURE 6 is a set of waveforms illustrating the operation of the code translator circuits shown in FIGURE 5.

The synchronized clock pulse signal from the above-described ambiguity resolver circuit is applied to a translator circuit which translates the split-phase PCM video signal into NRZ–C form. One embodiment of the translator circuit of this invention is shown in FIGURE 5, and its operation is illustrated by the waveforms in FIGURE 6. Referring to FIGURE 5, the translator circuit comprises an inverting amplifier 60, a single-pole-double-throw switch circuit 62, a strobe pulse generator single shot multivibrator 64, and a pulse integrating detector 66. Single-pole-double-throw switch circuit 62 is actuated by the synchronized clock pulse signal to rectify the split-phase PCM video signal, i.e., to invert the signal in one-half of each bit time period. In the case where a binary one is represented by a mark in the first half of the bit time period, the signal must be inverted in the second half of the bit time period for correct rectification. Accordingly, in this particular example, single-pole-double-throw switch circuit 62 is operable to invert the split-phase PCM video signal in the second half of each bit time period. This is accomplished by the simple expedient of routing the split-phase PCM signals through inverting amplifier 60, which has a gain of minus one, in the second half of the bit time period for each bit time period. Accordingly, single-pole-double-throw switch circuit 62 is operable to switch to the direct input terminal of the split-phase PCM video signal in response to the positive going pulse of the synchronized clock pulse signal, and to switch to the output terminal of the inverting amplifier in response to the negative going pulse of the synchronized clock pulse signal. This produces a rectified output signal as shown in waveform D of FIGURE 6, which is in the NRZ–C format, but which contains switching noise in the middle of each bit time period.

The switching noise is removed from the rectified output signals by means of pulse integrating detector 66 and strobe pulse generator 64. Pulse integrating detector 66 is a standrad integrating detector which integrates over the bit time periods defined by the strobe pulse generator 64 and dumps its charge at the end of that time. Pulse integrating detector 66 removes the noise spikes and produces an NRZ–C output signal which is compatible with standard computer circuitry.

Figures 7, 8:
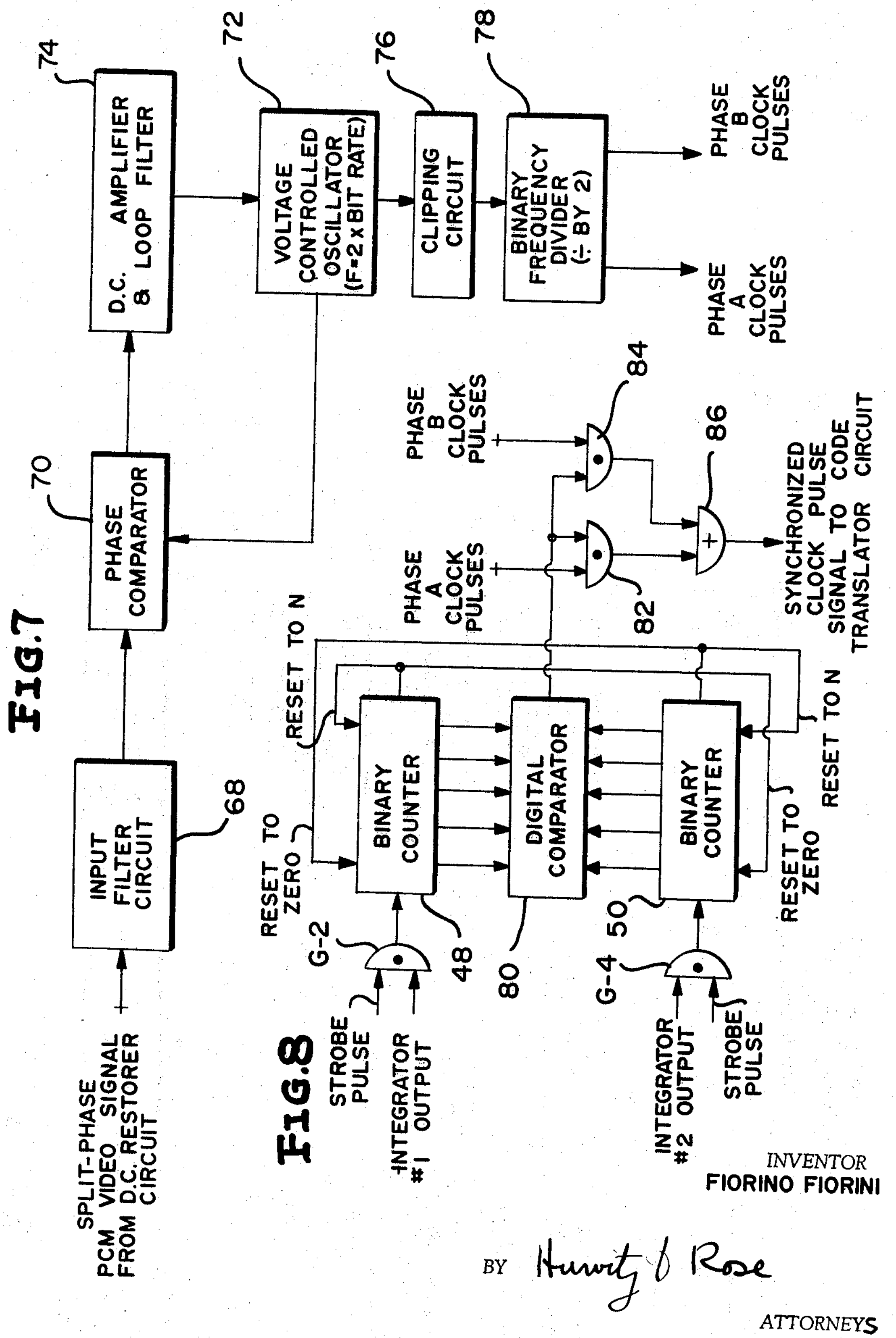
FIGURE 7 is a block diagram of a second clock pulse generator circuit which can be used in place of the clock pulse generator circuit shown in FIGURE 1.
FIGURE 8 is a block diagram of a second ambiguity resolver output circuit which can be used in place of the ambiguity resolver output circuit shown in FIGURE 3.

FIGURE 7 shows a second clock pulse generator circuit which can be used in place of the clock pulse generator circuit shown in FIGURE 1. The clock pulse generator circuit of FIGURE 7 uses a sinusoidal oscillator which is synced to the incoming split-phase PCM video signal by means of a phase locked loop. The split-phase PCM video signal from DC restorer circuit 20 (see FIGURE 1) is applied to an input filter circuit 68, which passes the sinusoidal component of the signal at twice the bit rate frequency. The output of filter circuit 68 is applied to a phase comparator circuit 70, which also receives an input from a voltage controlled oscillator 72, which operates at a frequency equal to twice the bit rate. Phase comparator 70 compares the phases of the two input signals and produces a DC output signal whose level is proportional to the difference in phase between the two input signals. Phase comparators of this type are well known in the art. The output of phase comparator 70 is applied to a DC amplifier and loop filter 74, which is coupled to the voltage control input of voltage controlled oscillator 72. When the phase or frequency of voltage controlled oscillator 72 differs from the phase or frequency of the split phase PCM video signals, the phase comparator 70 produces an error signal which is applied back to voltage controlled oscillator 72 via DC amplifier and loop filter 74 to correct the frequency of voltage controlled oscillator 72 and bring it into sync with the incoming split-phase PCM video signal. By this means, the output of oscillator 72 is continuously synchronized to the incoming split phase PCM video signal.

The output of voltage controlled oscillator 72 is applied to a clipping circuit 76, which can be an overdriven amplifier, to translate the sinusoidal output signal into an approximate square-wave form. The output of clipping circuit 76 is applied to binary frequency divider 78, which produces complementary clock pulse output signals at the bit frequency but 180° out of phase with each other.

FIGURE 8 shows an alternative digital output circuit which can be used to compare the outputs of the two binary counter circuits in the ambiguity resolver circuit shown in FIGURE 3. In the circuit of FIGURE 8, the output of binary counters 48 and 50 are applied in parallel to a digital comparator circuit 80 which continuously compares the state of the two counters and produces an output signal indicative of which counter is further advanced in its counting cycle. Digital comparator circuit 80 produces a positive output signal when the number in binary counter 50 is larger than the number of binary counter 48 and a negative output signal when the number in binary counter 48 is larger than the number in binary counter 50. The output of digital comparator 80 is applied in parallel to AND gates 82 and 84. AND gate 82 is enabled by a positive signal and disabled by a negative signal. AND gate 84 is enabled by a negative signal and disabled by a positive signal. Accordingly, when the count in binary counter 50 is larger than the count in binary counter 48, thus indicating that the phase A clock pulses are the correct phase, digital comparator circuit 80 will produce a positive output signal which enables gate 82 and disables gate 84. This allows the phase A clock pulses to pass through to OR gate 86 and blocks the phase B clock pulses. When the phase B clock pulses are the correct phase, the number in binary counter circuit 48 will be larger than the number in binary counter 50, and digital comparator 80 will produce a negative output signal which enables gate 84 and disables gate 82, thereby passing the phase B clock pulses to OR gate 86 and blocking the phase A clock pulses.

Although the digital comparator circuit shown in FIGURE 8 is more complex than that shown in FIGURE 3, the circuit of FIGURE 8 has the advantage of continuously comparing the contents of the two binary codes.

While I have described and illustrated one specific embodiment of my invention, it will be clear that variations of the details of construction which are specifically illustrated and described may be resorted to without departing from the true spirit and scope of the invention as defined in the appended claims.

I claim:

1. A synchronizer circuit for generating clock pulse signals in response to and synchronized with a split-phase pulse code modulated input signal, comprising:
  input means responsive to said split-phase pulse code modulated input signal;
  means coupled to said input means for differentiating said input signal to provide a series of positive and negative going voltage spikes synchronized with the transitions of said input signal;
  means responsive to said voltage spikes for providing a square wave signal whose frequency is determined by the minimum spacing between said voltage spikes; and
  means coupled to said last-mentioned means for dividing said square wave frequency by two to provide said clock pulse signals.

2. The synchronizer circuit of claim 1 wherein said means responsive to said voltage spikes for providing a square wave signal comprises:
  an inverter circuit coupled to receive said series of positive and negative going voltage spikes for inverting said negative going spikes to provide a series of all positive going voltage spikes; and
  a free running multivibrator coupled to receive said series of all positive group voltage spikes for providing said square wave signal.

3. The synchronizer circuit of claim 1 wherein said means for dividing said square wave frequency by two comprises:
  a binary frequency divider.

4. A synchronizer circuit for generating clock pulse signals in response to and synchronized with a split-phase pulse code modulated input signal, comprising:
  input means responsive to said input signal;
  filter means coupled to said input means for passing the fundamental sinusoidal component of said input signal;
  means for providing a sinusoidal signal whose frequency is determined by a control signal;
  means for comparing the phase of said fundamental sinusoidal component with the phase of said sinusoidal signal to provide said control signal;
  means responsive to said sinusoidal signal for providing a square wave signal whose frequency equals the frequency of said sinusoidal signal; and
  means coupled to said last-mentioned means for dividing said square wave signal frequency by two to provide side clock pulse signals.

5. The synchronizer circuit of claim 4 wherein said means for providing a sinusoidal signal whose frequency is determined by a control signal comprises:
  a voltage controlled oscillator.

6. The synchronizer circuit of claim 5 wherein said means for comparing comprises:
  a phase comparator coupled to said filter means and said voltage controlled oscillator for providing a DC voltage whose level is proportional to the difference in phase between said fundamental sinusoidal component and said sinusoidal signal; and
  a DC amplifier and loop filter coupled to receive said DC voltage for providing an error signal which is applied to said voltage controlled oscillator to control the frequency thereof.

7. The synchronizer circuit of claim 4 wherein said means for providing a square wave signal comprises:
  a clipping circuit.

8. The synchronizer circuit of claim 7 wherein said means for dividing said square wave signal frequency by two comprises:
  a binary frequency divider coupled to said clipping circuit.

9. A synchronizer circuit for generating clock pulse signals in response to and synchronized with a split-phase pulse code modulated input signal, said input signal containing binary information in a sequence of bit time periods, each of said bit time periods containing a bi-level signal which represents a binary 1 or a binary 0, said synchronizer circuit comprising:
  means for receiving said split-phase pulse code modulated input signal;
  means coupled to said receiving means for generating first and second pulse trains, each of said pulse trains being equal in frequency to the reciprocal of said bit time period but being 180° out of phase with each other;
  first integrating means coupled to said receiving means and responsive to said first pulse train for repeatedly integrating said input signal over an integrating interval which equals the period of said first pulse train;
  second integrating means coupled to said receiving means and responsive to said second pulse train for repeatedly integrating said input signal over an integrating interval which equals the period of said second pulse train;
  means for comparing the outputs of said first and second integrating means over a plurality of bit time periods to determine which of said first and second integrating means produces the smaller number of non-zero integrals over said plurality of bit timer periods; and
  means responsive to said means for comparing for selecting the pulse train yielding the smaller number of non-zero integrals as the clock pulse signal.

10. The synchronizer circuit of claim 9 wherein said means for generating first and second pulse trains comprises:
  means for differentiating said input signal to provide a series of positive and negative going voltage spikes synchronized with the transitions of said input signal;
  means responsive to said voltage spikes for providing a square wave signal whose frequency is determined by the minimum spacing between said voltage spikes; and
  means coupled to said last-mentioned means for dividing said square wave frequency by two to provide said first and second pulse trains.

11. The synchronizer circuit of claim 9 wherein said means for generating said first and second pulse trains comprises:

filter means for passing the fundamental sinusoidal component of said input signal;
means for providing a sinusoidal signal whose frequency is determined by a control signal;
means for comparing the phase of said fundamental sinusoidal component with the phase of said sinusoidal signal to provide said control signal;
means responsive to said sinusoidal signal for providing a square wave signal whose frequency equals the frequency of said sinusoidal signal; and
means coupled to said last-mentioned means for dividing said square wave signal frequency by two to provide said first and second pulse trains.

12. The synchronizer circuit of claim 9 wherein said first and second integrating means each comprise:
an integrating capacitor responsive to said input signal;
means responsive to the respective pulse train for periodically discharging said integrating capacitor after the respective integrating interval;
a positive and a negative threshold circuit coupled in parallel to said integrating capacitor for defining a zero level for the charge on said capacitor, said positive threshold circuit developing an output signal whenever the charge on said capacitor exceeds a predetermined positive level and said negative threshold circuit developing an output signal whenever the charge on said capacitor exceeds a predetermined negative level; and
gating means coupled to said positive and negative threshold circuits and the respective pulse train for passing to said comparing means the output signal developed at the end of each integrating interval.

13. The synchronizer circuit of claim 12 wherein said means for periodically discharging said integrating capacitor comprises:
a strobe pulse generator coupled to receive the respective pulse train for producing a relatively narrow strobe pulse at the start of each integrating interval;
delay means coupled to said strobe pulse generator for delaying the strobe pulse by a time interval which is approximately equal to the width of said strobe pulse; and
single-pole-single-throw switch means connected in parallel with said integrating capacitor and responsive to said delayed strobe pulse for periodically discharging said capacitor through said switch means upon the occurrence of a delayed strobe pulse.

14. The synchronizer circuit of claim 13, wherein said gating means comprises:
an OR gate having two inputs and an output, one of said two inputs being connected to said positive threshold circuit and the other of said two inputs being connected to said negative threshold circuit; and
an AND gate having two inputs and an output, one of said two inputs being connected to the output of said OR gate and the other of said two inputs being connected to said strobe pulse generator, the output of said AND gate being connected to said means for comparing.

15. The synchronizer circuit of claim 9 wherein said means for comparing the outputs of said first and second integrating means comprises:
a first binary counter coupled to said first integrating means for providing a first output pulse when said first integrating means indicates a predetermined number M of non-zero integrals;
a second binary counter coupled to said second integrating means for providing a second output pulse when said second integrating means indicates M non-zero integrals;
means responsive to said first output pulse for resetting said second binary counter to zero and said first binary counter to a number N greater than zero but less than M; and
means responsive to said second output pulse for resetting said first binary counter to zero and said second binary counter to N.

16. The synchronizer circuit of claim 15 wherein said means for selecting comprises:
a flip-flop circuit having two stable states, a set terminal, a reset terminal, and two output terminals;
means connecting said first binary counter to said set terminal to provide a first enabling signal at one of said two output terminals on the occurrence of said first output pulse;
means connecting said second binary counter to said reset terminal to provide a second enabling signal at the other of said two output terminals on the occurrence of said second output pulse;
a first AND gate having two inputs and an output, one of said two inputs being coupled to said one of said two output terminals of said flip-flop circuit and the other of said two inputs being coupled to receive said second pulse train;
a second AND gate having two inputs and an output, one of said two inputs being coupled to said other of said two output terminals of said flip-flop circuit and the other of said two inputs being coupled to receive said first pulse train; and
an OR gate having two inputs and an output, said two inputs being coupled to the respective outputs of said first and second AND gates, said output providing said clock pulse signal.

17. The synchronizer circuit of claim 9 wherein said means for comparing the outputs of said first and second integrating means comprises:
a first binary counter coupled to said first integrating means for providing a first output pulse when said first integrating means indicates a predetermined number M of non-zero integrals;
a second binary counter coupled to said second integrating means for providing a second output pulse when said second integrating means indicates M non-zero integrals;
means responsive to said first output pulse for resetting said second binary counter to zero and said first binary counter to a number N greater than zero but less than M;
means responsive to said second output pulse for resetting said first binary counter to zero and said second binary counter to N; and
digital comparator means coupled to said first and second binary counters for continuously producing a positive output signal when the instantaneous count in said second binary counter exceeds the instantaneous count in said first binary counter and a negative output signal when the instantaneous count in said first binary counter exceeds the instantaneous count in said second binary counter.

18. The synchronizer circuit of claim 17 wherein said means for selecting comprises:
a first AND gate having two inputs and an output, one of said two inputs being coupled to receive said second pulse train and the other of said two inputs being coupled to said digital comparator means;
a second AND gate having two inputs and an output, one of said two inputs being coupled to receive said first pulse train and the other of said two inputs being coupled to said digital comparator means, said first AND gate being enabled by said negative output signal and disabled by said positive output signal and said second AND gate being enabled by said positive output signal and disabled by said negative output signal; and
an OR gate having two inputs and an output, said two inputs being coupled to the respective outputs of said first and second AND gates, said output providing said clock pulse signal.

19. The synchronizer circuit of claim 9 further comprising:

rectifier means responsive to said clock pulse signal and said input signal for inverting the input signal occurring in one-half of each of said bit time periods to translate said split-phase pulse code modulated input signal into single-phase form.

20. The sync circuit of claim 19 wherein said rectifier means comprises:

means coupled to said receiving means for inverting the sign of said input signal;

single-pole-double-throw switch means coupled to said receiving means and said inverting means and coupled to receive said clock pulse signal to alternately provide, at its output, the input signal during one-half of each of said bit time periods and the inverted input signal during the other half of each of said bit time periods;

a strobe pulse generator coupled to receive said clock pulse signal for producing a relatively narrow strobe pulse at the start of each time bit period; and an integrating detector coupled to said switch means and said strobe pulse generator for integrating the output of said switch means over the bit time periods established by said strobe pulses.

No references cited.

ARTHUR GAUSS, *Primary Examiner.*

S. D. MILLER, JR., *Assistant Examiner.*